(12) United States Patent
Huang et al.

(10) Patent No.: US 12,095,369 B2
(45) Date of Patent: Sep. 17, 2024

(54) LOW-PROFILE POWER MODULE

(71) Applicant: MONOLITHIC POWER SYSTEMS, INC., San Jose, CA (US)

(72) Inventors: Daocheng Huang, Santa Clara, CA (US); Jinghai Zhou, Cupertino, CA (US); Xinmin Zhang, San Jose, CA (US); Yishi Su, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 354 days.

(21) Appl. No.: 17/678,172

(22) Filed: Feb. 23, 2022

(65) Prior Publication Data

US 2023/0268833 A1 Aug. 24, 2023

(51) Int. Cl.
*H02M 3/158* (2006.01)

(52) U.S. Cl.
CPC .................................. *H02M 3/158* (2013.01)

(58) Field of Classification Search
CPC ..................................................... H02M 3/158
See application file for complete search history.

(56) References Cited

U.S. PATENT DOCUMENTS

2019/0109538 A1* 4/2019 Zhou ...................... H05K 1/181

OTHER PUBLICATIONS

MP86976 Intelli-Phase Solution (Intengrated HS/LS FETs and Driver) in 3×6mm TLGA, Jan. 23, 2019, 14 pages, Monolithic Power Systems (MPS).

* cited by examiner

*Primary Examiner* — Rafael O De Leon Domenech
(74) *Attorney, Agent, or Firm* — Beyer Law Group LLP

(57) ABSTRACT

A power module has a substrate with a bottom side and a component side. Power converters of the power module are implemented using monolithic integrated circuit (IC) switch blocks that are mounted on the component side of the substrate. The power converters include output inductors that are disposed within the substrate. An end of an output inductor is connected to a switch node of a monolithic IC switch block and another end of the output inductor is connected to an output voltage node of the power module.

18 Claims, 3 Drawing Sheets

LOW-PROFILE POWER MODULE

TECHNICAL FIELD

The present invention is directed to electrical circuits, and more particularly but not exclusively to power modules.

BACKGROUND

A power module comprises power converters that are implemented on a substrate, such as a printed circuit board (PCB). Power modules may be employed to provide one or more supply voltages to various electrical devices. A power module may provide two or more output phases by incorporating a corresponding number of power converters, with each power converter providing a phase of the output. Embodiments of the present invention pertain to power modules with a low profile, allowing them to be used in automotive, computer server, and other applications where space is a premium.

BRIEF SUMMARY

In one embodiment, a power module comprises a substrate, a plurality of monolithic integrated circuit (IC) switch blocks, and a plurality of output inductors. The monolithic IC switch blocks are mounted on a component side of the substrate, and the output inductors are disposed within the substrate. A first end of an output inductor is connected to a switch node of a corresponding monolithic IC switch block and a second end of the output inductor is connected to an output voltage node of the power module.

In another embodiment, a power module comprises a substrate having a component side and a bottom side that is opposite the component side. The power module comprises a first pair of switches and a second pair of switches that are mounted on the component side. A first output inductor has a first end that is connected to a first switch node formed by the first pair of switches and a second end that is connected to a first output voltage node. A second output inductor has a first end that is connected to a second switch node formed by the second pair of switches and a second end that is connected to a second output voltage node. The first and second output inductors are embedded within the substrate.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures. The figures are not necessarily drawn to scale.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
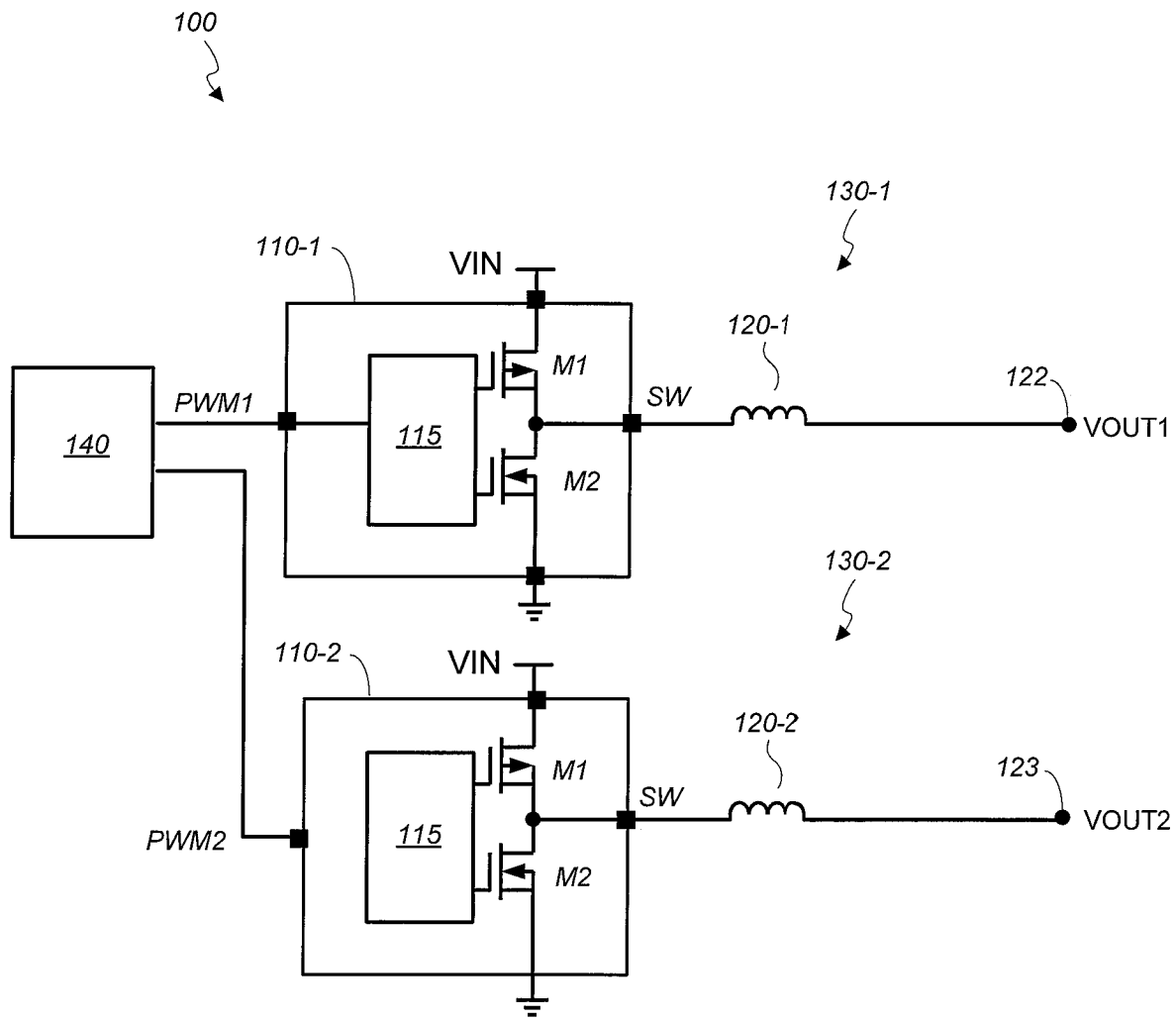
FIG. 1 shows a schematic diagram of a power module in accordance with an embodiment of the present invention.

FIG. 1 shows a schematic diagram of a power module 100 in accordance with an embodiment of the present invention. In the example of FIG. 1, the power module 100 has two power converters 130 (i.e., 130-1, 130-2), with each power converter 130 comprising an output inductor 120 (i.e., 120-1, 120-2) and a monolithic integrated circuit (IC) switch block 110 (i.e., 110-1, 110-2). In the example of FIG. 1, a power converter 130 is a buck converter. As can be appreciated, a power converter 130 may also be configured as a boost converter or other type of power converter depending on the application.

Each of the power converters 130-1 and 130-2 receives an input voltage VIN to generate an output voltage VOUT (i.e., VOUT1, VOUT2). The output voltages of the power converters 130-1 and 130-2 may be connected together and interleaved to generate a multiphase output voltage. For example, an output voltage node 122 and an output voltage node 123 may be connected together, with each power converter 130 providing a phase of a multiphase output voltage. In that example, the power module 100 may include additional power converters to add more phases. Capacitors, such as input capacitors, supply capacitors, and other components not necessary to the understanding of the invention are not shown in FIG. 1 for clarity of illustration.

In one embodiment, a switch block 110 is implemented using an MP86976 Intelli-Phase™ Solution monolithic IC, which is commercially-available from Monolithic Power Systems, Inc. Other suitable monolithic IC's may also be used without detracting from the merits of the present invention. A switch block 110 has, integrated therein, a driver 115 and a pair of switches M1, M2 (e.g., Metal-Oxide-Semiconductor Field-Effect transistor (MOSFET)). Other circuits for implementing the driver 115, such as an auxiliary 3.3V power supply circuit, are not shown for clarity of illustration. As shown in FIG. 1, a switch block 110 has a first pin for receiving a pulse width modulation (PWM) signal, a second pin for receiving an input voltage VIN, a third pin for connecting to power ground, and a fourth pin that is connected to a switch node SW formed by the switches M1, M2. The drain of the switch M1 is connected to the input voltage VIN and the source of the switch M2 is connected to power ground. The source of the switch M1 is connected to the drain of the switch M2 at the switch node SW.

Generally speaking, PWM control is well-known in the art. Briefly, an external PWM controller 140 generates a PWM signal, which is received by a driver 115 at the first pin of the switch block 110. The driver 115 turns the switches M1, M2 ON and OFF in accordance with the PWM signal. Turning the switch M1 ON while turning the switch M2 OFF connects the input voltage YIN to the switch node SW (by way of the switch MD, whereas turning the switch M1 OFF while turning the switch M2 ON connects the switch node SW to power ground (by way of the switch M2). A first end of an output inductor 120 is connected to the switch node SW and a second end of the output inductor 120 is connected to an output voltage node (i.e., 122, 123) where an output voltage VOUT is developed. In the example of FIG. 1, the PWM controller 140 generates the PWM signals PWM1, PWM2 such that a corresponding output voltage VOUT is maintained in regulation. Other circuits for implementing the PWM control, such as sense circuits, are not shown for clarity of illustration.

The input voltage VIN, output voltage VOUT, and switching frequency of the switches M1, M2 depend on the particulars of the monolithic IC switch block 110. In one embodiment where the monolithic IC switch block 110 is implemented using the aforementioned MP86976 IntelliPhase™ Solution monolithic IC, the input voltage VIN is in the range of 3V to 7V, the output voltage VOUT is in the range of 0.4V to 2V (e.g., 0.8V), and the switching frequency of the switches M1, M2 is in the range of 1 MHz to 2 MHz (e.g., 1.5 MHz). The relatively low input voltage VIN and relatively high switching frequency of the switches M1, M2 allow for a relatively small physical size of the output inductor 120 (e.g., 2.5 mm×5 mm×1.2 mm). As will be more apparent below, the output inductor 120 may be embedded within the substrate of the power module 100 to achieve a low profile.

Figure 2:
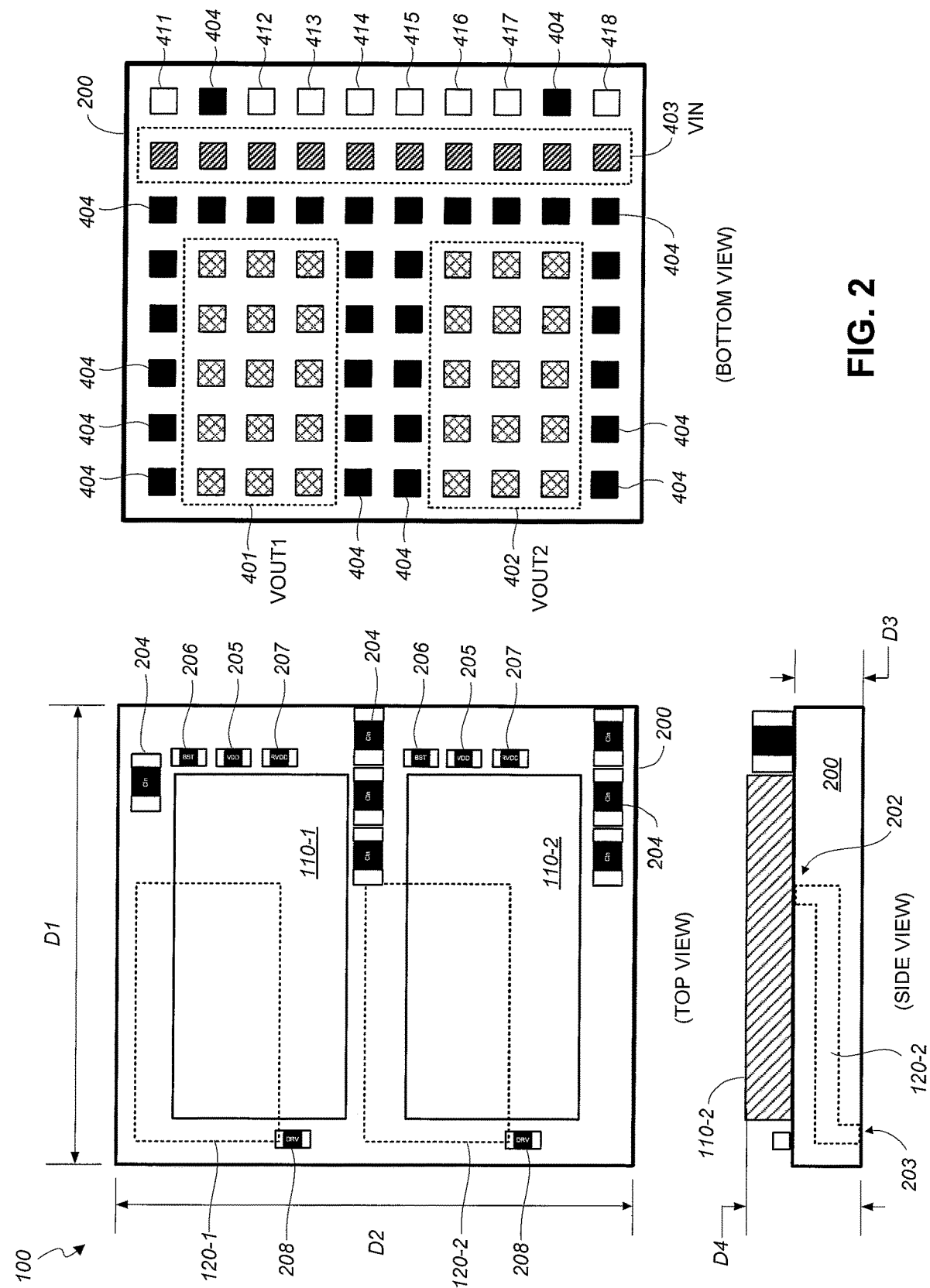
FIG. 2 shows a top view, a bottom view, and a side view of a physical layout of the power module of FIG. 1 in accordance with an embodiment of the present invention.

FIG. 2 shows, from the upper left hand corner in clockwise direction, a top view, a bottom view, and a side view of a physical layout of the power module 100 in accordance with an embodiment of the present invention. The power module 100 has a substrate 200, which in one embodiment is a printed circuit board (PCB). The top view of the substrate 200 shows the "component side" of the substrate 200, whereas the bottom view shows the bottom side of the substrate 200. The switch blocks 110, capacitors, and other components are mounted on the component side.

The bottom side, which is opposite the component side, has a plurality of pins that connect nodes of the power module 100 to components that are external to the power module 100, such as a PWM controller, etc. A pin may be a pad or other means for electrically connecting nodes and components. A pin may have a square (e.g., as in a land grid array), round (e.g., as in a ball grid array), or other shape. The power module 100 may be employed as part of a power supply (not shown). The pins of the power module 100 may be connected to corresponding sockets on a substrate of the power supply.

The top view of the power module 100 shows the switch block 110-1, switch block 110-2, and various capacitors mounted on the component side, such as input capacitors (e.g., see 204), capacitors of RC filters of supply voltages for internal digital logic control (e.g., 205, 207), bootstrap capacitors (e.g., see 206), filter capacitors of supply voltages for switch drivers (e.g., see 208), etc. As can be appreciated, the number and type of capacitors on the power module 100 depend on the particulars of the application. Generally, the capacitors on the power module 100 have relatively low capacitance. In the example of FIG. 2, a switch block 110 is the tallest component on the substrate 200. In one embodiment, the substrate 200 has a width D1 of about 8 mm; a length D2 of about 9 min, and a substrate thickness D3 of about 1.5 mm. In one embodiment, a height D4 from the bottom surface of the substrate 200 to the topmost surface of a switch block 110 is 2.3 mm.

The output inductors 120-1 and 120-2, which are represented by dotted lines in FIG. 2, are embedded within the substrate 200. A first end of an output inductor 120 (see 202) is connected to a switch node of a corresponding switch block 110, and a second end of the output inductor 120 (see 203) is connected to a corresponding output voltage node. The relatively low inductance of each of the output inductors 120-1 and 120-2 in conjunction with the layout of the power module 100 allow the output inductors 120-1 and 120-2 to be embedded within the substrate 200, thereby lowering the profile of the power module 100. In one embodiment, the height D4 of the power module 100 is 2.3 mm and at most 5 mm.

In the example of FIG. 2, each pin of the power module 100 has a square shape, e.g., 0.45 mm×0.45 mm square. The pins that are connected to power ground, some of which are labeled as "404", are depicted in black. Not all of the ground pins are labeled for clarity of illustration. The pins that are connected to the output voltage node 122 (shown in FIG. 1), where the output voltage VOUT1 is developed, are collectively labeled as "401"; the pins that are connected to the output voltage node 123 (shown in FIG. 1), where the output voltage VOUT2 is developed, are collectively labeled as "402"; and the pins that are connected to receive the input voltage VIN are collectively labeled as "403". Pin 411 is connected to receive a PWM signal to the switch block 110-1; pin 418 is connected to receive a PWM signal to the switch block 110-2; pin 412 is connected to provide a current monitor signal from the switch block 110-1; pin 417 is connected to provide a current monitor signal from the switch block 110-2; pin 413 is connected to provide a temperature monitoring signal from the switch block 110-1; pin 416 is connected to provide a temperature monitoring signal from the switch block 110-2; pin 414 is connected to receive a VCC supply voltage; and pin 415 is connected to receive an enable signal. As can be appreciated, the pinout of the power module 100 depends on implementation details, such as the particular switch block 110 employed. The arrangement of the pins on the bottom surface of the substrate 200 may vary to suit particular applications.

Figure 3:
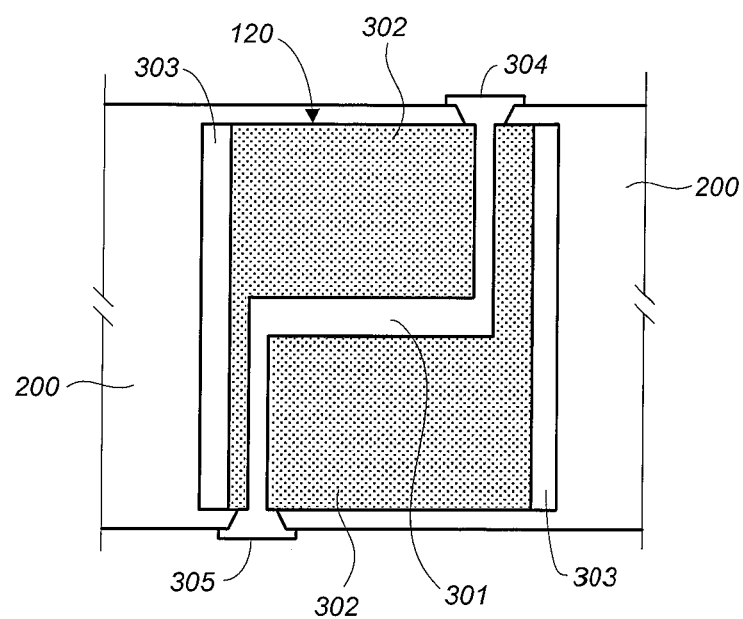
FIG. 3 shows a cross-sectional view of a substrate of the power module of FIG. 2 in accordance with an embodiment of the present invention.

FIG. 3 shows a cross-sectional view of the substrate 200 in accordance with an embodiment of the present invention. FIG. 3 provides a schematic illustration of an output inductor 120 and is not to scale. In one embodiment, the output inductor 120 is a one turn inductor. The output inductor 120 may also have a few number of turns. The output inductor 120 comprises a conductor 301 and a magnetic core 302 that surrounds the conductor 301. In one embodiment, the conductor 301 comprises copper and the magnetic core 302 comprises a suitable core material, such as ferrite or powder iron. A gap 303 is between the magnetic core 302 and the substrate material, which in one embodiment comprises a PCB substrate. Generally speaking, a PCB is a laminated sandwich structure of conductive layers (e.g., copper) and insulating/dielectric layers (e.g., fiberglass epoxy laminate). The gap 303 may be an air gap that is filled with epoxy molding compound. A first end of the conductor 301 (see 304) comes out of the component side of the substrate 200 to connect to the switch node of a corresponding switch block 110, and a second end of the conductor 301 (see 305) comes out of the bottom side of the substrate 200 to a pin that is connected to a corresponding output voltage node.

In one embodiment, the inductor 120 has an inductance less than 100 nH. As can be appreciated, the inductance of the output inductor 120 may vary depending on the volume of the substrate 200. Larger substrates allow physically larger inductors to be embedded. For example, with a thickness D3 (shown in FIG. 2) of 1.5 mm, the output inductor 120 may have dimensions of 2.5 mm×5 mm×1.2 mm with an inductance of about 30 nH.

Low-profile power modules have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A power module comprising:
   a substrate;
   a first monolithic integrated circuit (IC) switch block mounted on a component side of the substrate, the first monolithic IC switch block including a first pair of switches, a first pin for receiving a control signal for controlling switching of the first pair of switches, and a second pin that is connected to a first switch node formed by the first pair of switches;
   a second monolithic IC switch block mounted on the component side of the substrate, the second monolithic IC switch block including a second pair of switches, a first pin for receiving a control signal for controlling switching of the second pair of switches, and a second pin that is connected to a second switch node formed by the second pair of switches;
   a first output inductor that is embedded within the substrate, the first output inductor having a first end that is connected to the first switch node and a second end that is connected to a first output voltage node; and
   a second output inductor that is embedded within the substrate, the second output inductor having a first end that is connected to the second switch node and a second end that is connected to a second output voltage node.

2. The power module of claim 1, wherein the first output inductor has an inductance that is less than 100 nH.

3. The power module of claim 1, wherein the substrate has a plurality of pins that connect out of a bottom side of the substrate, and the second end of each of the first and second output inductors is connected to a pin of the plurality of pins on the bottom side of the substrate.

4. The power module of claim 1, wherein the pin of the plurality of pins provides an output voltage of the power module.

5. The power module of claim 1, wherein the power module has a height measured from a surface of the bottom side of the power module to a topmost surface of a tallest component mounted on the power module of at most 5 mm.

6. The power module of claim 1, wherein the first output inductor comprises:
   a conductor having a first end that connects out to the component side of the substrate and a second end that connects out to the bottom side of the substrate; and
   a magnetic core around the conductor.

7. The power module of claim 6, further comprising a gap within the substrate, the gap being between the magnetic core and the substrate.

8. The power module of claim 1, wherein the second end of the first output inductor is connected to a pin on a bottom side of the power module and the second end of the second output inductor is connected to another pin on the bottom side of the power module.

9. The power module of claim 1, wherein the first monolithic IC switch block is a tallest component on the component side of the substrate.

10. The power module of claim 1, wherein the first and second output voltage nodes are connected together.

11. A power module comprising:
    a substrate having a component side and a bottom side that is opposite the component side;
    a first pair of switches that forms a first switch node;
    a second pair of switches that forms a second switch node, the first and second pairs of switches being mounted on the component side;
    a first output inductor having a first end that is connected to the first switch node and a second end that is connected to a first output voltage node; and
    a second output inductor having a first end that is connected to the second switch node and a second end that is connected to a second output voltage node,
    wherein the first and second output inductors are embedded within the substrate.

12. The power module of claim 11, wherein each of the first and second output inductors has an inductance value less than 100 nH.

13. The power module of claim 11, further comprising:
    a plurality of pins that protrude out of the bottom side of the substrate, a first pin of the plurality of pins being connected to receive a first control signal for controlling switching of the first pair of switches, and a second pin of the plurality of pins being connected to receive a second control signal for controlling switching of the second pair of switches.

14. The power module of claim 13, wherein each of the first and second control signals is a pulse width modulation (PWM) signal.

15. The power module of claim 13, wherein a third pin of the plurality of pins is connected to the output voltage node.

16. The power module of claim 13, wherein a fourth pin of the plurality of pins is connected to receive an input voltage.

17. The power module of claim 11, wherein each of the first and second pair of switches is implemented in a monolithic integrated circuit (IC) switch block that is mounted on the component side of the substrate.

18. The power module of claim 11, wherein the first and second output voltage nodes are connected together.

* * * * *